United States Patent [19]

Kobayashi

[11] Patent Number: 5,581,419
[45] Date of Patent: Dec. 3, 1996

[54] MAGNETIC TAPE DRIVE FOR DRIVING MAGNETIC TAPE HAVING LEADER BLOCK AT LEADING END

[75] Inventor: Masayoshi Kobayashi, Kawasaki, Japan

[73] Assignee: Fujitsu Limited, Japan

[21] Appl. No.: 303,442

[22] Filed: Sep. 9, 1994

[30] Foreign Application Priority Data

Sep. 10, 1993 [JP] Japan ..................... 5-225817

[51] Int. Cl.$^6$ ..................... G11B 15/18; G11B 5/008; G08B 1/56
[52] U.S. Cl. ..................... 360/71; 360/95; 242/332
[58] Field of Search ..................... 360/71, 74.3, 95, 360/90, 93, 130.21; 242/332.1, 348.2, 348.3, 332

[56] References Cited

U.S. PATENT DOCUMENTS

| | | | |
|---|---|---|---|
| 4,970,612 | 11/1990 | Renders et al. | 360/71 X |
| 4,991,037 | 2/1991 | Shimizu et al. | 360/71 |
| 5,032,936 | 7/1991 | Fujioka et al. | 360/71 |
| 5,038,234 | 8/1991 | Abeille | 360/71 X |

FOREIGN PATENT DOCUMENTS 6-26042  4/1994  Japan.

*Primary Examiner*—Aristotelis Psitos
*Assistant Examiner*—Regina Y. Neal
*Attorney, Agent, or Firm*—Greer, Burns & Crain, Ltd.

[57] ABSTRACT

A magnetic tape drive for driving a magnetic tape stored in a cartridge for writing and reading data as an external storage device of a computer, etc., and equipped with a leader block at a distal end thereof, comprises a file reel having the cartridge fitted thereto, and a machine reel rotating in the same direction as the file reel while the leader block is fitted to a hub thereof, and taking up the magnetic tape, wherein data is written/read to and from the magnetic tape in a travelling path between the file reel and the machine reel. In this construction, the magnetic tape is wound at an initial tension lower than a normal tape tension at the start of winding of the magnetic tape by the machine reel until a predetermined number of turns of the magnetic tape is wound on the machine reel, and thereafter the tape is wound at a greater tension. As a result, the leader block can be correctly fixed to the hub of the machine reel, and even when a thin magnetic tape is used, read/write errors do not occur, and the apparatus can be made more compact.

10 Claims, 8 Drawing Sheets

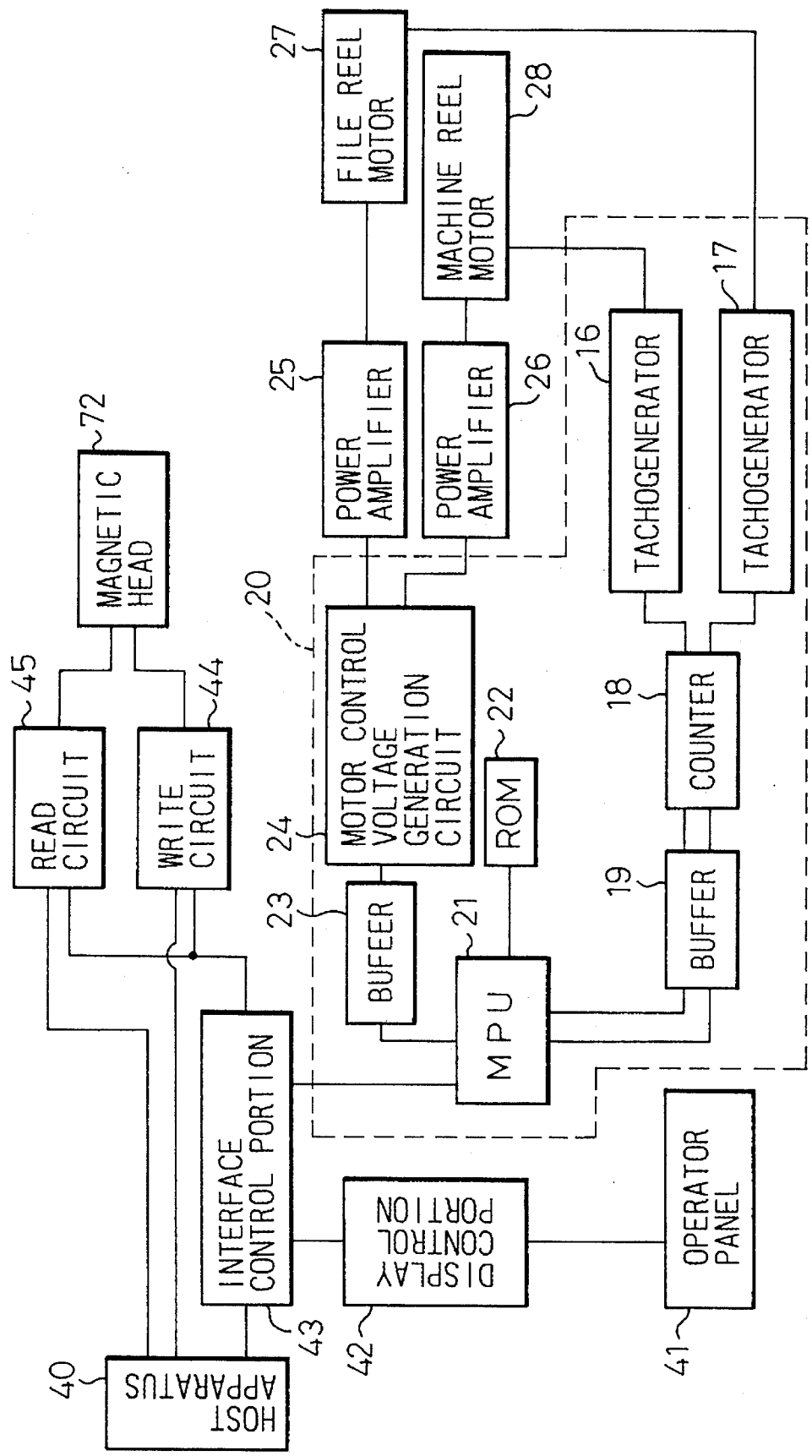

MAGNETIC TAPE DRIVE FOR DRIVING MAGNETIC TAPE HAVING LEADER BLOCK AT LEADING END

BACKGROUND OF THE INVENTION

1. Field of the Invention

The present invention relates to a magnetic tape drive for driving a magnetic tape having a leader block at a leading end thereof. More particularly, it relates to a magnetic tape drive for driving a magnetic tape used for writing/reading data as an external storage device of a computer, or the like, equipped with a leaders block at a leading end thereof, and accommodated inside a cartridge.

2. Description of the Related Art

Recently, an increase in memory capacity has been desired in a magnetic tape drive used as an external storage device of a computer, etc. One of the methods of increasing this memory capacity is to reduce the thickness of a tape and to elongate the tape. However, when the thickness of the magnetic tape is reduced in a magnetic tape used for writing and reading data as an external storage device of a computer, etc., equipped with a leader block at a leading end thereof and accommodated in a cartridge, the following problems occur.

(1) When the leader block is not correctly fixed to a hub of a reel on the take-up side, the outer periphery of the hub does not coincide with the outer periphery of the leader block and a step occurs on the magnetic tape wound on the hub. In other words, when the leader block excessively enters the fitting portion of the hub, a recess is defined in the outer peripheral portion of the hub. The leader block does not correctly enter the fitting portion of the hub, a concave-convexities occur on the outer peripheral portion of the hub. A fold occurs in the magnetic tape due to these concavo-convexities, and a read/write error unavoidably occurs at this .fold portion.

(2) If the rotating direction of a take-up reel is made opposite to the rotating direction of a reel on the supply side in order to eliminate this problem, an important region adjacent to the magnetic head becomes unusable as a a travelling path for the magnetic tape, and a reduction of the size of the apparatus is prevented.

SUMMARY OF THE INVENTION

It is therefore an object of the present invention to provide a magnetic tape drive for driving a magnetic tape having a leading block which does not generate a read/write error even when a thin magnetic tape is used, and which can reduce the size of the magnetic tape drive.

According to the present invention, there is provided a magnetic tape drive for driving a magnetic tape used for writing and reading data as an external storage of a computer, etc, equipped with a leader block at a distal end thereof, and wound and accommodated in a cartridge, which comprises a first reel having the cartridge fitted thereto, for controlling feed and winding of the magnetic tape inside the cartridge; a second reel equipped with lock means for locking the leader block at a hub thereof and capable of taking up the magnetic tape by rotating in the same direction as the first reel; a transfer mechanism for transferring the leader block to the lock means at the point of time when the cartridge is fitted to the first reel; a travelling mechanism interposed between the first and second reels, and causing the magnetic tape to travel between the first and second reels; a magnetic head disposed at an intermediate position of the travelling mechanism, for writing or reading data to and from the magnetic tape; push means for pushing the magnetic tape wound on the hub of the second reel, from outside in a radial direction of the second reel, and control means for controlling the rotation of the first and second reels, taking up the magnetic tape at an initial tension lower than a normal tape tension until the magnetic tape is wound on the second reel in a predetermined number of turns at the start of winding of the magnetic tape by the second reel, and thereafter taking up the magnetic tape at a tension greater than a lock force of the push means.

Generally, the travelling mechanism described above comprises a first roller guide coming into contact with the magnetic tape pulled out from the cartridge and bending the travelling direction of the magnetic tape by about 90 degrees in a direction of the second reel, and the magnetic head is disposed in a zone between the first roller guide and the second roller guide. The engagement means disposed in a hub of the second roller guide comprises an engagement groove for accepting the leader block and a lock mechanism disposed in this engagement groove and locking the leader block inserted into the engagement groove.

In the magnetic tape drive for driving the magnetic tape equipped with the leader block, having the construction described above, the initial tension T may be determined in accordance with the following formula where the push force of the push means is P and a frictional coefficient between the magnetic tape and the outer peripheral surface of the hub of the second reel is μ;

$$T < \mu P$$

In the magnetic tape drive for driving the magnetic tape equipped with the leader block according to the present invention, the magnetic tape is taken up at a tension lower than a normal tape tension at an initial stage of winding of the magnetic tape by the machine reel, and is thereafter taken up at a large tension. Accordingly, the leader block can be correctly fixed to the hub, and even when a thin magnetic tape is used, the read/write error does not occur and the size of the apparatus can be reduced.

BRIEF DESCRIPTION OF THE DRAWINGS

The present invention will be more clearly understood from the description as set forth below with reference to the accompanying drawings, wherein:

FIG. 6 is a block circuit diagram showing a drive circuit of each portion in the magnetic tape drive shown in FIG. 4.

DESCRIPTION OF THE PREFERRED EMBODIMENTS

Before describing the preferred embodiments, an explanation will be given of the conventional tape drive for driving the magnetic tape having a leader block at a leading end shown in FIGS. 1A to 3.

Figure 1A:
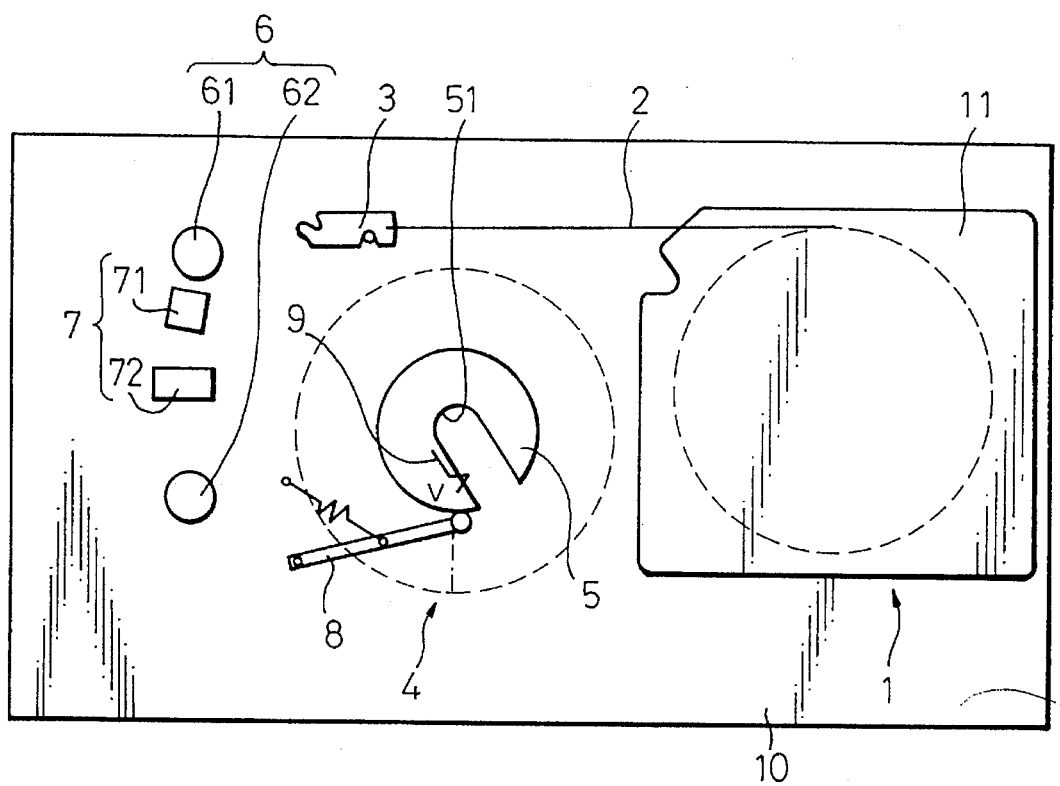
FIG. 1A is an explanatory view useful for explaining the state where a magnetic tape is wound on a machine reel while a leader block is carried, in a magnetic tape drive equipped with the leader block, according to the prior art.

FIG. 1A shows a drive 10 of a magnetic tape 2 equipped with a leader block 3 according to the prior art. The magnetic tape 2 is wound on a hub, not shown, and is stored inside a cartridge 11. This cartridge 11 is set on a spindle of a file reel 1.

Figure 1B:
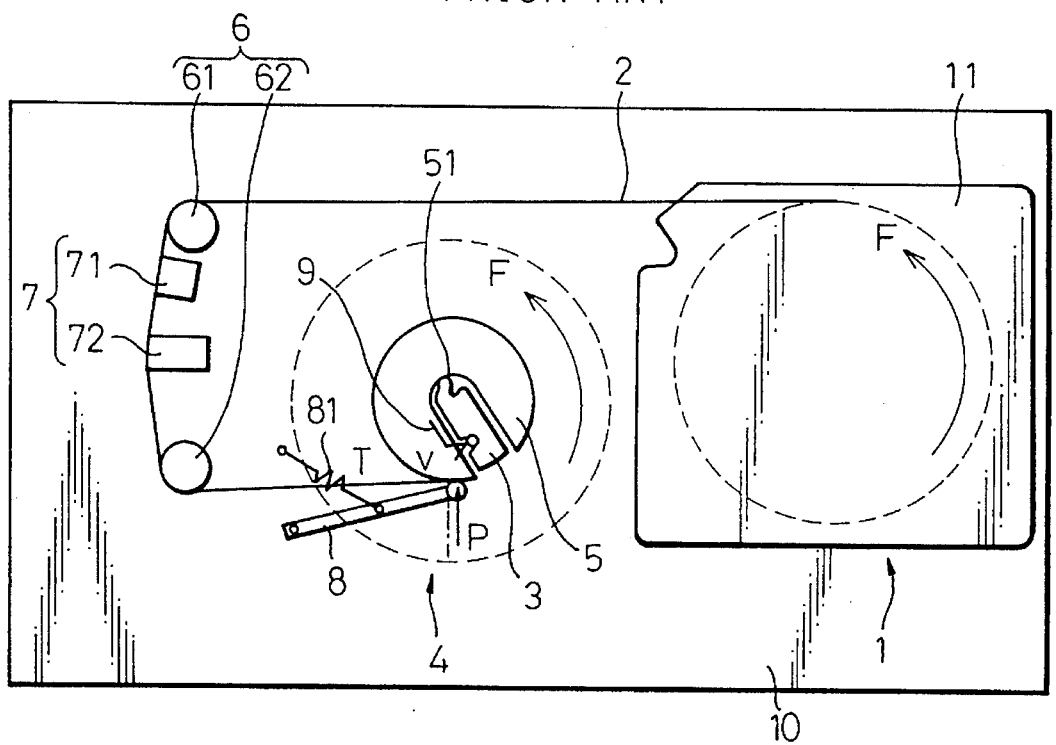
FIG. 1B is an explanatory view useful for explaining the state where the leader block of the magnetic tape is fitted to the machine reel in the magnetic tape drive equipped with the leader block, according to the prior art.

When the cartridge 11 is set on the file reel 1 of the magnetic tape drive 10, the leader block 3 is pulled out from the cartridge 11 by a threader mechanism (transport mechanism). The leader block 3 is caused to travel and is transported to a machine reel 4 which takes up the magnetic tape 2 while passing through a travel mechanism 6 consisting of a first roller guide 61 and a second roller guide 62. Next, the leader block 3 is inserted into an engagement groove 51 formed in the hub 5 of the machine reel 4 as shown in FIG. 1B. The machine reel 4 generally rotates in the same direction as the file reel 1 and takes up the magnetic tape 2 supplied from the cartridge 11. The engagement groove 51 formed in the hub 5 of the machine reel 4 engages with the set leader block 3, and is equipped with a lock mechanism 9 which prevents the leader block 3 from jumping out from the engagement groove 51.

Under the state shown in FIG. 1B where the leader block 3 is inserted into the hub 5, the travelling direction of the magnetic tape 2 pulled out from the cartridge 11 is bent by about 90° by the first roller guide 611 and is again bent by about 90° by the second roller guide 62. A magnetic head 7 for reading/writing/erasing data from and to the magnetic tape 2 is disposed in the travelling path of the tape between the first and second roller guides 61, 62. Generally, the magnetic head 7 disposed in the proximity of the first roller guide 61 is an erase head 71 and the magnetic head 7 in the proximity of the second roller guide 62 is a read/write head 72.

A pack arm 8 for pushing the magnetic tape 2 wound on the hub 5 is disposed on a chassis of the magnetic tape drive 10 in the proximity of the machine reel 4. The proximal end of this pack arm 8 is rotatably fitted to the chassis of the magnetic tape drive 10, and is pulled by a spring 81 in such a manner as to press the outer circumference of the hub 5.

Figure 2A:
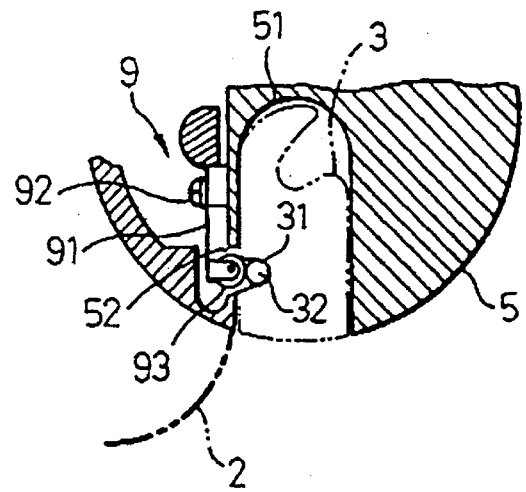
FIG. 2A is a partial enlarged horizontal sectional view showing the state where the leader block is normally fitted to a hub of the machine reel.

Here, an explanation will be given of the lock mechanism 9 disposed on the hub 5 with reference to FIG. 2A. The engagement groove 51 for accepting the leader block 3 is defined in the hub 5, and an opening 52 is formed on the side surface of this engagement groove 51. The lock mechanism 9 comprises a leaf spring 91, a screw 92 and a roller 93. The leaf spring 91 is fitted inside the hub 5 by the screw 92, and the roller 93 is disposed at the distal end portion of the spring 91. A part of the roller 93 protrudes into the engagement groove 51 through the opening 52.

On the other hand, a recess 31 is defined in the leader block 3. The distal end portion of the magnetic tape 2 is fitted into this recess 31, a pin 32 is also fitted into the recess 31, and the magnetic tape 2 is fitted to the leader block 3. The depth of the recess 31 is greater than the diameter of the pin 32. Accordingly, even in the state where the pin 32 is fitted, the recess 31 remains at the outer peripheral portion of the leader block 3. Accordingly, when the leader block 3 is fitted into the engagement groove 51, the roller 93 of the lock mechanism 9 is pushed by the leader block 3 and the leaf spring 91 is bent, so that the roller 93 is pushed out from inside the engagement groove 51. When the recess 31 of the leader block 3 reaches the position of the opening 52, the roller 93 is again caused to protrude into the engagement groove 51 by the leaf spring 91 and engages with the recess 31. In consequence, the leader block 3 is locked.

After the leader block 3 is inserted into the hub 5 in this manner, the file reel 1 and the machine reel 4 are rotated in the same direction (the direction indicated by an arrow F in FIG. 1B). Accordingly, the magnetic tape 2 is pulled out from the cartridge 11 and is taken up on the hub 5 of the machine reel 4, and reading or writing of data is conducted from or to the magnetic tape 2. On the other hand, when the file reel 1 and the machine reel 4 together rotate in the opposite direction to the arrow F shown in FIG. 1B, the magnetic tape 2 wound on the hub 5 of the machine reel 4 is rewound on the cartridge 11.

In the magnetic tape drive 10 having the construction described above, however, the push position of the roller 93 disposed at the distal end of the leaf spring 91 to the leader block 3 changes with dimensional accuracy of each of the leader block 3 and the hub 5. For this reason, particularly when the file reel 1 and the machine reel 4 rotate in the same direction, the outer circumference of the hub 5 does not coincide with the outer circumference at the trailing end of the leader block 3, and a step occurs at the outer peripheral portion of the hub 5.

Figure 2B:
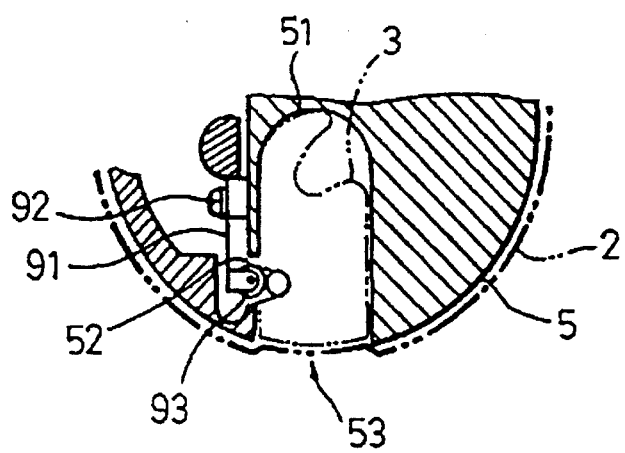
FIG. 2B is a partial enlarged horizontal sectional view showing an abnormal state where the leader block is fitted to the hub of the machine reel while it excessively enters the hub.
Figure 2C:
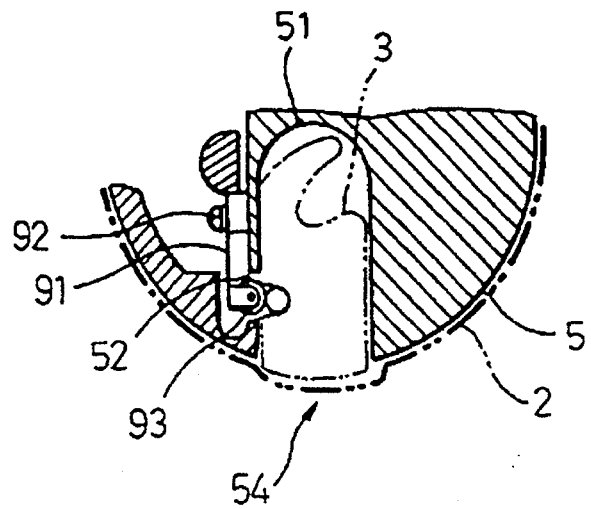
FIG. 2C is a partial enlarged horizontal sectional view showing an abnormal state where the leader block is fitted while protruding from the hub of the machine reel.

FIG. 2B shows the abnormal state where the leader block 3 excessively enters the hub 5 of the machine reel 4 and is fitted to the hub 5. In this state, the recess 53 comes to the portion of the engagement groove 51 of the leader block 3. On the other hand, FIG. 2C shows the abnormal state where the leader block 3 is fitted while protruding from the hub 5 of the machine reel 4. In this state, the protruberance portion 54 comes to the portion of the engagement groove 51 of the leader block 3. In either of these cases, a fold occurs in the magnetic tape 2 wound on the hub 5 at the portion of the recess 53 or the protuberance 54. When such a fold occurs on the magnetic tape 2, a read error or a write error occurs when the fold portion passes by the magnetic tape 7, and this phenomenon remarkably occurs in a magnetic tape having a reduced thickness to improve memory capacity.

Figure 3:
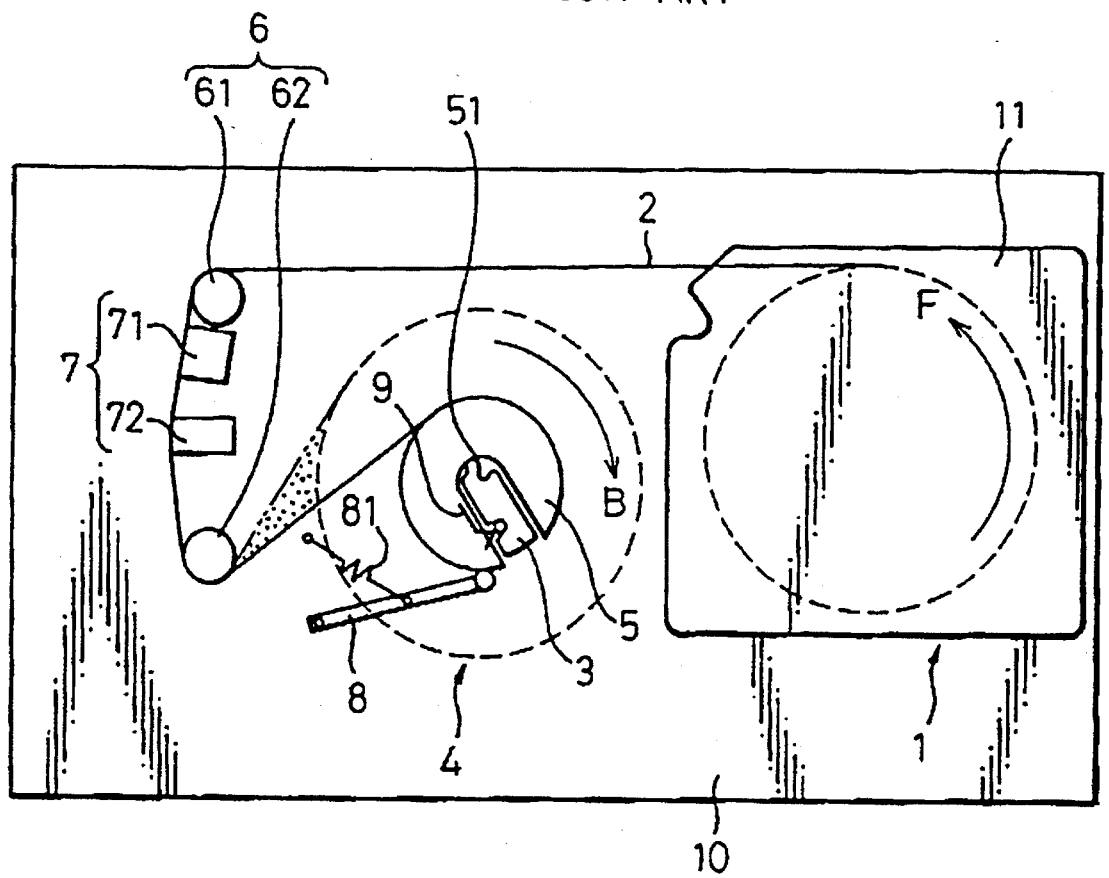
FIG. 3 is an explanatory view useful for explaining the problems with the magnetic tape drive wherein a rotating direction of the machine reel is opposite to a rotating direction of a file reel.

In order to solve such a problem, an attempt has been made to make the rotating direction of the machine reel 4 opposite to the rotating direction of the file reel 1 (represented by the arrow F), as represented by the arrow B in FIG. 3. According to this method, the lock mechanism 9 using the leaf spring becomes unnecessary for the engagement groove 51 of the leader block 3. However, according to this method, the back portion of the magnetic head 7 (represented by dots in FIG. 3) as the space for disposition of important components falls within the moving range of winding/rewinding of the magnetic tape 2. Accordingly, another problem occurs in that miniaturization of the magnetic tape drive 10 becomes difficult.

Next, the construction of the magnetic tape drive 100 equipped with the leader block 3 according to the present invention will be explained. Incidentally, like reference numerals will be used to identify like constituents as in the magnetic tape drive 10 according to the prior art in order to make the invention more easily understandable.

Figure 4:
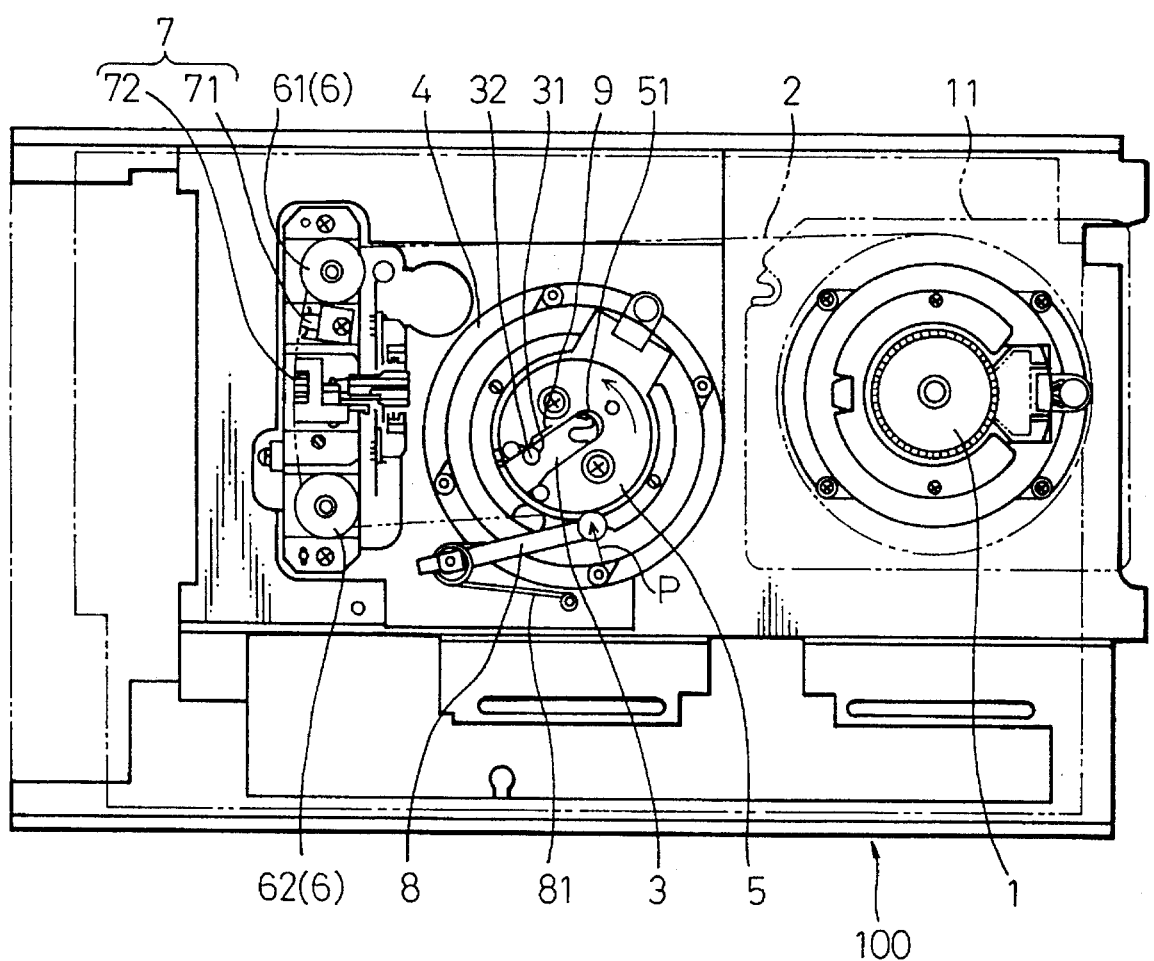
FIG. 4 is a plan view showing the construction of a magnetic tape drive equipped with a leader block according to the present invention.

FIG. 4 is a plan view showing the overall construction of the drive 100 of the magnetic tape 2 equipped with the leader block 3 according to the first embodiment of the present invention. In FIG. 4, reference numeral 1 denotes the file reel, 2 is the magnetic tape, 3 is the leader block 4 having a recess 31, is the machine reel, 5 is the hub, 6 is the travelling mechanism including the first roller guide 61 and the second roller guide 62, 7 is the magnetic head equipped with the erase head 71 and the read/write head 72, 8 is the pack arm, 9 is the lock mechanism, 11 is the cartridge, and 32 is a pin inserted into the recess 31 to fit the magnetic tape 2.

The magnetic tape 2 is wound on the hub, not shown, and is stored in the cartridge 11. The leader block 3 is fitted to the distal end portion of the magnetic tape 2. This cartridge 11 is set on the file reel 1. Incidentally, the magnetic tape 2 in this embodiment is 17 μm thick and is thinner than ordinary 30 μm-thick magnetic tape which have been used conventionally. The tape length per cartridge is about twice that of the conventional magnetic tape.

The travelling mechanism 6 of the magnetic tape 2 comprises the first roller guide 61 for bending by about 90° the travelling direction of the magnetic tape 2 pulled out from the cartridge 11 and the second roller guide 62 for bending again the travelling direction by about 90°. The magnetic head 7 comprises the magnetic head 71 for effecting data erase and the read/write head 72 for effecting data read/write, and these heads 71, 72 are disposed in the tape travelling path between the first and second roller guides 61, 62. Generally, the magnetic head 7 closer to the first roller guide 61 is the erase head 71, and the magnetic head 7 closer to the second roller guide 62 is the read/write head 72.

The machine reel 4 equipped with the engagement groove 51 for accepting the leader block in the hub 5 thereof rotates in the same direction as the file reel 1 and takes up the magnetic tape 2. The lock mechanism 9 is provided to this engagement groove 51 for accepting the leader block 3 so as to prevent the leader block 3 from jumping out from the engagement groove 51.

The pack arm 8 for pressing the magnetic tape 2 wound on the hub 5 is disposed on the chassis of the magnetic tape drive 100 in the proximity of the machine reel 4. The proximal end portion of this pack arm 8 is rotatably fitted to the chassis of the magnetic tape drive 100 and is pulled by the spring 81 in such a manner as to press the outer periphery of the hub 5.

When the cartridge 11 is set on the file reel 1 in the magnetic tape drive 100 having the construction described above, the leader block 3 is picked up by the threader mechanism, not shown in the drawing, and is pulled out from the cartridge 11. The threader mechanism mechanism transfers the leader block 3 to the machine reel 4 for taking up the magnetic tape 2 while bypassing the travelling mechanism 6 comprising the first roller guide 61 and the second roller guide 62. Thereafter, the leader block 3 is inserted into the engagement groove 51 formed in the hub 5 of the machine reel 4.

Under the state where the leader block 3 is inserted into the hub 5, the travelling direction of the magnetic tape 2 pulled out from the cartridge 11 is bent by about 90° by the first roller guide 61 and is again bent by about 90° by the second roller guide 62. When the file reel 1 and the machine reel 4 rotate in the same direction, data is read/written and erased from, to and from the magnetic tape 2 by the magnetic heads 7 disposed in the tape travelling path between the first and second roller guides 61, 62.

Figure 5:
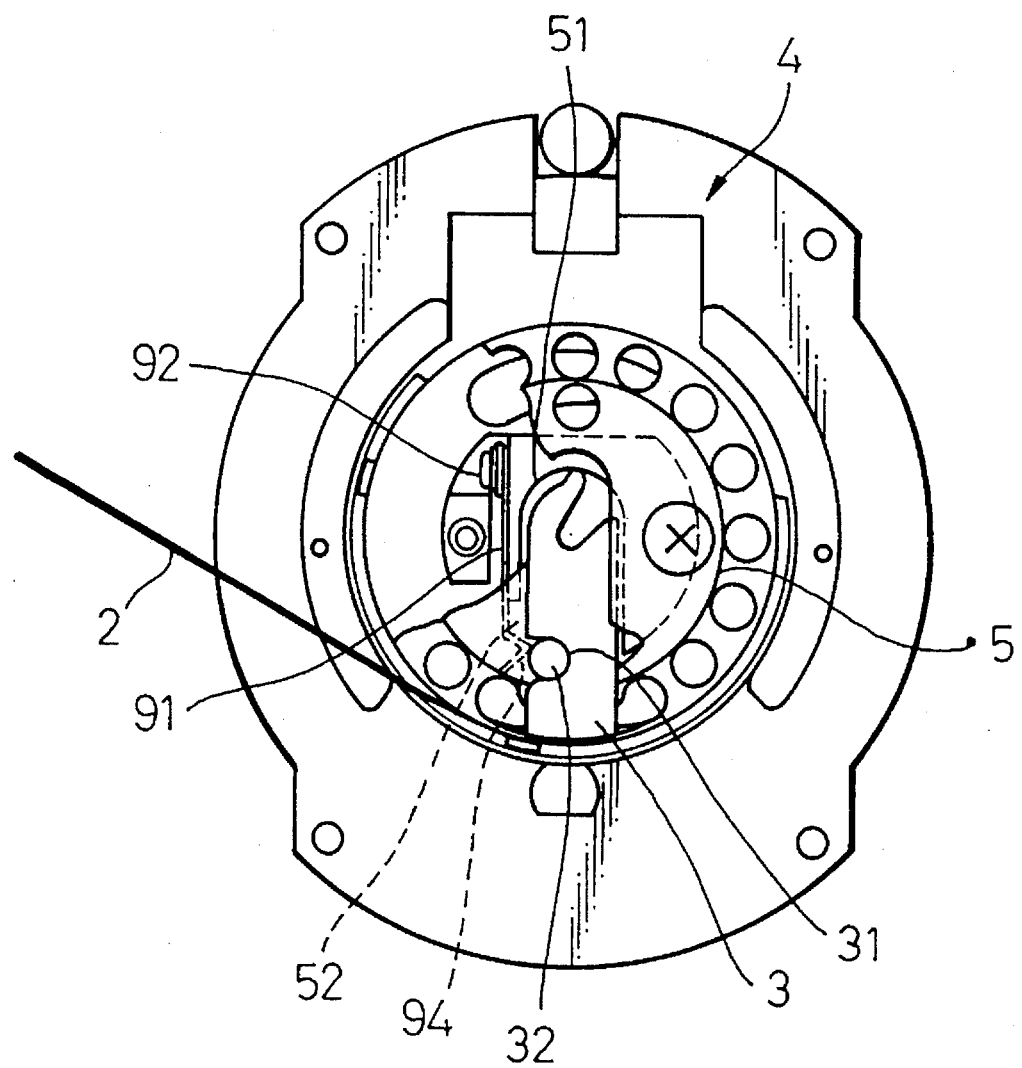
FIG. 5 is a partial enlarged view showing, in enlargement, the hub of the machine reel shown in FIG. 3.

Here, the lock mechanism 9 disposed in the hub 5 will be explained with reference to FIG. 5. The engagement groove 51 for accepting the leader block 3 is defined in the hub 5, and the opening formed in the side surface of the engagement groove 51. The lock mechanism 9 in this embodiment comprises the leaf spring 91 and the screw 92. The leaf spring 91 is fitted into the hub 5 by the screw 92, and a pawl portion 94 is formed by bending the distal end portion of the leaf spring 91 into a V-shape towards the engagement groove 51. The pawl portion 94 of the leaf spring 94 passes through the opening 52 and protrudes into the engagement groove 51.

On the other hand, the recess 31 is formed in the leader block 3 and the distal end portion of the magnetic tape 2 is fitted into this recess 31. The pin 32 is also fitted into the recess 31, and the magnetic tape 2 is thus fitted to the leader block 3. Since the depth of the recess 31 is greater than the diameter of the pin 32, the recess still remains in the outer peripheral portion of the leader block 3 even when the pin 32 is fitted. Accordingly, when the leader block 3 is fitted into the engagement groove 51, the pawl portion 94 of the lock mechanism 9 is pushed by the leader block 3, the leaf spring 91 is bent, and the pawl portion 94 is pushed out from inside the engagement groove 51. When the recess 31 of the leader block 3 comes to the position of the opening 52, the pawl portion 94 is caused to again protrude into the engagement groove 51 by the leaf spring 91 and engages with the recess 31. Accordingly, the leader block 3 is locked.

Next, the control circuit disposed in the magnetic tape drive 100 shown in FIG. 4 will be explained with reference to FIG. 6. The control circuit includes a built-in microprocessor unit (MPU) 21, which controls a display of an operator panel 41, servo control of operation with a host apparatus 40, and so forth by a program (firm ware) stored in a ROM 22. Reference numeral 43 denotes an interface control portion for transferring the control data (command) sent from the host apparatus 40 to the MPU 21 and various sense data to the host apparatus 40.

In FIG. 6, the portion encompassed by dash lines represents the servo control portion 20 for controlling travelling of the magnetic tape. The file reel 1 is driven by the file reel motor 27 and the machine reel 4, by the machine reel motor 28. Tachogenerators 16 and 17 are provided for the file reel motor 27 and to the machine reel motor 28, respectively. The number of pulses generated by these tachogenerators 16, 17 is counted by a counter 18, and the count value of the counter 18 is stored in a buffer 19.

The servo control portion 20 includes another buffer 23. This buffer 23 stores the digital signals sent from the MPU 21 in accordance with the tape feed command from the host apparatus 40. The digital signal output from the buffer 23 is converted to an analog signal by a motor control voltage generation circuit 24. The motor control voltage from this motor control voltage generation circuit 24 is input to power amplifiers 25, 26, and is amplified by them, and is used as driving current for the file reel motor 27 and the machine reel motor 28.

On the other hand, write data sent from the host apparatus is modulated by a write circuit control signal sent from the MPU 21 through the interface control portion 43 in a write circuit 44, and the data is recorded by the magnetic head 72 on the magnetic tape 2. The data recorded on the magnetic tape 2 is read by the magnetic head 72 in a read circuit 45 in accordance with a read circuit control signal sent from the MPU 21 through the interface control portion 43. The data so read is sent to the host apparatus 40 by the read circuit 45.

Further, a message from the host apparatus 40 sent through the interface control portion 43, a status message of the magnetic tape drive sent from the MPU 21 through the interface control portion 43, and so forth, are displayed by a display control portion 42 on an operator panel 41. When data of switches disposed on the operator panel 41 are detected by the display control portion 42, the display control portion 42 sends these data to the interface control portion 43.

Figure 7A:
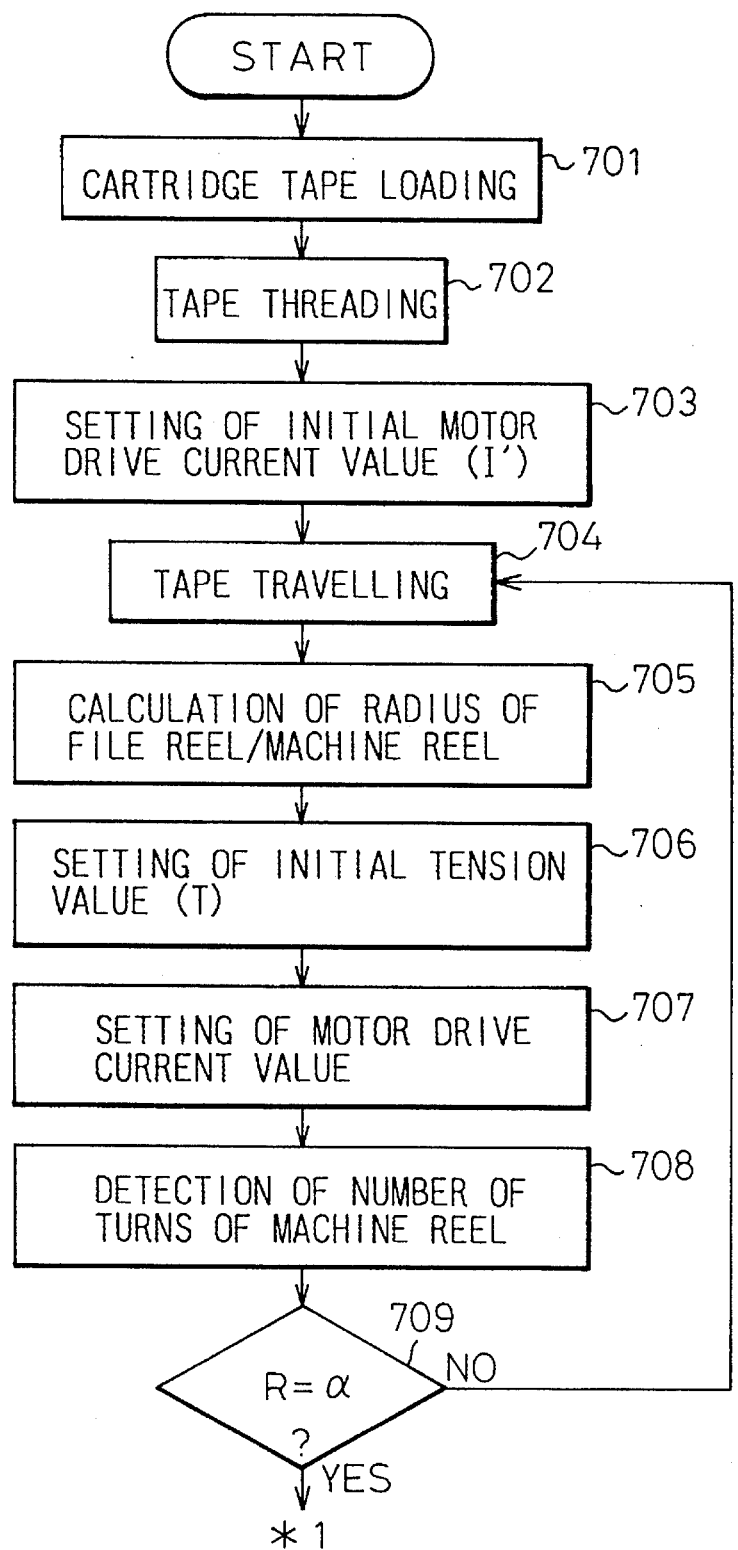
FIG. 7A and 7B are flowcharts showing the drive procedures of the magnetic tape drive shown in FIG. 4 by the drive circuit shown in FIG. 6.
Figure 7B:
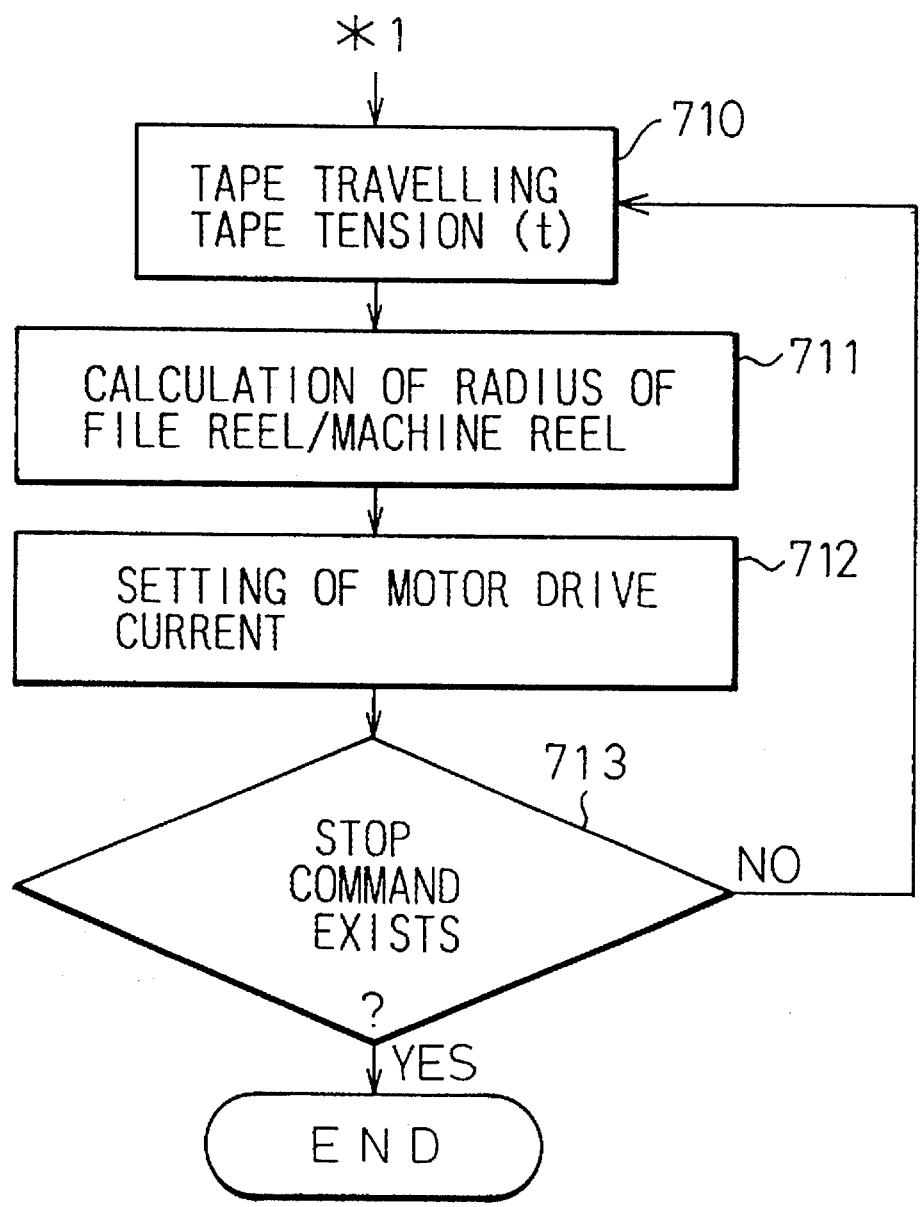

Next, the procedures in which the magnetic tape drive 100 is driven by the drive circuit having the construction shown in FIG. 6 will be explained with reference to the flowchart of FIGS. 7A and 7B.

First, at the step 701, the MPU 21 loads the cartridge 11 to the file reel 1 in accordance with the command from the host apparatus 40. When loading is completed, the MPU 21 drives the threader mechanism, not shown in the drawing, at the step 702, and tape threading is conducted. The term "tape threading" means the following operation.

(a) The threader mechanism picks up the leader block 3 from the cartridge 1.

(b) The leader block 3 is transferred from the side of the file reel 1 towards the side of the machine reel and the magnetic tape 2 is wound on the first roller guide 61, the magnetic heads 7 and the second roller guide 62.

(c) The leader block 3 is set to the engagement groove 51 formed in the hub 5 of the machine reel 4.

At the next step 703, an initial motor drive current value is set. In other words, the initial motor drive current value I'[A] stored in the ROM 22 is applied to the MPU 21. At the step 704, the file motor 1 and the machine motor 4 are driven by the initial motor drive current value I'[A]. In this state, the magnetic tape 2 is supplied from the cartridge 11 and is wound on the machine motor 4 through the travelling mechanism 6.

During the travel of the magnetic tape 2, the following operations are carried out:

(1) Calculation of the radii of the file reel 1 and the machine reel 4 at the step 705.

More concretely, the following calculation is carried out from the numbers of revolution of the file reel 1 and the machine reel 4 obtained from the tachogenerators 16 and 17:

$$Rm/Rf = Nf/N \quad (1)$$

where Rm is the radius of the outer peripheral portion of the magnetic tape wound on the machine reel 4, Rf is the radius of the outer peripheral portion of the magnetic tape wound on the file reel 1, and N is a rotating speed of the machine reel 4.

In this embodiment, the tachogenerator 17 is arranged so as to output 500 pulses per circumference of the reel and the tachogenerator 16 for the machine reel 4 is arranged so as to output one pulse per circumference.

(2) Setting of an initial tension value Tg at the step 706

The tension T of the magnetic tape 2 in this instance is expressed by the following formula:

$$T < \mu P \quad (2)$$

where P is a push force of the pack arm 8 and μ is a frictional coefficient between the magnetic tape 2 and the outer peripheral surface of the hub 5 of the machine reel 4.

Since μ=0.2 and P=300 [g] in this embodiment, T<60 [g] by putting these values into the formula (2).

(3) Setting of the motor drive current value at the step 707

The motor drive current value I [A] hereby calculated is determined from the following equation (3) from the formula (1) and from the radii of the file reel 1 and the machine reel 4 under the condition that the tape length of the magnetic tape is constant:

$$I = T \times R/Kt \quad (3)$$

where R is the radius of each reel and Kt is a torque constant.

The radius of each reel R is calculated by the following formula:

$$R = Ro + nTtp \quad (4)$$

where Ro is the radius of unwound reel, n is a number of rotation, and Ttp is a thickness of the tape.

By the way, the motor drive current I during tape travel, which corresponds to the initial tension set, can be obtained by the formula (3), but when the formula (3) is calculated, the processing speed drops.

In this embodiment, therefore, a table of the drive current I corresponding to the radius R of each reel is in advance stored in the ROM 22, and the motor drive current I during the tape travel is determined from this table.

At the next step 708, the number of turns R of the machine reel 4 is detected by the pulse output from the tachogenerator 16. At the subsequent step 709, whether or not the number of turns of the machine reel 4 reaches a predetermined number of turns α is judged, and when R=α the flow proceeds to the steps 710 et seq., and when R≠α the flow returns to the step 704.

In this embodiment, when the number of turns R of the machine reel 4 reaches α, the flow proceeds to the step 710, and the tape travels at a normal tension t (e. g. 225 g) which is greater than the lock force of the lock mechanism 9 of the leader block 3 (the push force of the leaf spring 91) and is greater than the initial tension T.

Thereafter, during the time the radii of the magnetic tape 2 wound on the file reel 1 and on the machine reel 4 are being calculated at the steps 711 and 712, until a stop command is judged as being generated from the host apparatus 40 at the step 713, the tape continues to travel. Incidentally, since the processing at the steps 711 and 712 is the same as the processing from the steps 704 to 707, an explanation thereof will be omitted.

Due to the control described above, the magnetic tape 2 is wound at the tension T lower than the normal tape tension, at the initial stage of winding. Therefore, the leader block 3 does not jump out from the engagement groove 51 formed in the hub 5 of the machine reel 4. When the number of turns of the magnetic tape 2 on the machine reel 4 thereafter becomes greater than the predetermined number, the magnetic tape 2 is wound on the machine reel 4 at a tension greater than the lock force of the lock mechanism 9. Accordingly, a step does not occur between the outer periphery of the leader block 3 and that of the hub 5, and the step does not occur in the magnetic tape 2 even when the thickness of the magnetic tape 2 is small. In this way, read/write errors can be eliminated.

Because the file reel 1 and the machine reel 4 are driven for rotation in the same direction, the travelling path does not come to the back of the magnetic heads 7. Accordingly, the space at this portion can be effectively utilized, and the apparatus can be made more compact.

What is claimed is:

1. A magnetic tape drive for driving a magnetic tape used for writing and reading data, as an external storage device, equipped with a leader block at a distal end thereof, and wound and accommodated in a cartridge comprising:

a first reel having said cartridge fitted thereto, for controlling feed and winding of said magnetic tape inside said cartridge;

a second reel equipped with lock means for locking said leader block, at a hub thereof, and capable of taking up said magnetic tape by rotating in the same direction as said first reel;

a transfer mechanism for transferring said leader block to said lock means at the point of time when said cartridge is fitted to said first reel;

a travelling mechanism interposed between said first reel and said second reel, and causing said magnetic tape to travel between said first reel and said second reel;

a magnetic head disposed at an intermediate position of said travelling mechanism, for writing or reading data to and from said magnetic tape;

push means for pushing said magnetic tape wound on said hub of said second reel, from outside in a radial direction of said second reel; and control means for controlling the rotation of said first and second reels, taking up said magnetic tape at an initial tension lower than a tape tension during the transfer of the tape from the first reel to the second reel until said magnetic tape is wound on said second reel at a predetermined number of turns at the start of winding of said magnetic tape by said second reel, and thereafter taking up said magnetic tape at a tension greater than a lock force of said lock means.

2. A magnetic tape drive for driving a magnetic tape as set forth in claim 1, wherein said travelling mechanism comprises a first roller guide coming into contact with said magnetic tape pulled out from said cartridge and bending the travelling direction of said magnetic tape by about 90°, and a second roller guide bending said magnetic tape coming from said first roller guide by about 90° in a direction of said second reel.

3. A magnetic tape drive for driving a magnetic tape as set forth in claim 2, wherein said magnetic head is disposed inside a zone extending from said first roller guide and said second roller guide.

4. A magnetic tape drive for driving a magnetic tape as set forth in claim 1, wherein said lock means disposed in said hub of said second roller guide comprises an engagement groove for accepting said leader block and a lock mechanism disposed inside said engagement groove and locking said leader block inserted into said engagement groove.

5. A magnetic tape drive for driving a magnetic tape as set forth in claim 4, wherein said travelling mechanism comprises a first roller guide coming into contact with said magnetic tape pulled out from said cartridge and bending the travelling direction of said magnetic tape by about 90° and a second roller guide bending said magnetic tape coming from said first roller guide by about 90° in a direction of said second reel.

6. A magnetic tape drive for driving a magnetic tape as set forth in claim 5, wherein said magnetic head is disposed in a zone between said first roller guide and said second roller guide.

7. A magnetic tape drive for driving a magnetic tape as set forth in claim 1, wherein said initial tension T is expressed by the following formula where the push force of said push means is P and a frictional coefficient between said magnetic tape and the outer peripheral surface of said hub of said second reel is $\mu$;

$$T < \mu P.$$

8. A magnetic tape drive for driving a magnetic tape as set forth in claim 7, wherein said lock means disposed in said hub of said second roller guide comprises an engagement groove for accepting said leader block and a lock mechanism disposed inside said engagement groove and locking said leader block inserted into said engagement groove.

9. A magnetic tape drive for driving a magnetic tape as set forth in claim 8, wherein said travelling mechanism comprises a first roller guide coming into contact with said magnetic tape pulled out from said cartridge and bending the travelling direction of said magnetic tape by about 90° and a second roller guide bending said magnetic tape coming from said first roller guide by about 90° in the direction of said second reel.

10. A magnetic tape drive for driving a magnetic tape as set forth in claim 9, wherein said magnetic head is disposed in a zone between said first roller guide and said second roller guide.

* * * * *

UNITED STATES PATENT AND TRADEMARK OFFICE
CERTIFICATE OF CORRECTION

PATENT NO. : 5,581,419
DATED : December 3, 1996
INVENTOR(S) : Kobayashi

It is certified that error appears in the above-indentified patent and that said Letters Patent is hereby corrected as shown below:

Column 1, line 33, delete "hub. The" and insert --hub. When the--.

Column 1, line 38, delete ". fold" and insert --fold--.

Column 1, line 42, delete "a a" and insert --a--.

Column 3, line 50, delete "611" and insert --61--.

Column 3, line 52, delete "reading/writing/e rasing" and insert --reading/writing/erasing--.

UNITED STATES PATENT AND TRADEMARK OFFICE
CERTIFICATE OF CORRECTION

PATENT NO. : 5,581,419
DATED : December 3, 1996
INVENTOR(S) : Kobayashi

It is certified that error appears in the above-indentified patent and that said Letters Patent is hereby corrected as shown below:

Column 5, line 17, delete "block 4" and insert --block--.

Column 5, line 18, delete "31, is" and insert --31, 4 is--.

Column 6, line 21, delete "spring 94" and insert --spring 91--.

Signed and Sealed this

Ninth Day of September, 1997

*Attest:*

BRUCE LEHMAN

*Attesting Officer*   *Commissioner of Patents and Trademarks*